United States Patent
Radatti et al.

(10) Patent No.: US 7,703,078 B2
(45) Date of Patent: Apr. 20, 2010

(54) APPARATUS, METHODS AND ARTICLES OF MANUFACTURE FOR SOFTWARE DEMONSTRATION

(75) Inventors: Peter V. Radatti, Conshohocken, PA (US); Richard J. Perry, Drexel Hill, PA (US); Gary L. Blawat, II, Menomee Falls, WI (US)

(73) Assignee: Cybersoft, Inc., Conshohocken, PA (US)

( * ) Notice: Subject to any disclaimer, the term of this patent is extended or adjusted under 35 U.S.C. 154(b) by 973 days.

(21) Appl. No.: 10/654,080

(22) Filed: Sep. 3, 2003

(65) Prior Publication Data

US 2005/0048448 A1    Mar. 3, 2005

(51) Int. Cl.
*G06F 9/44* (2006.01)
(52) U.S. Cl. ............................. 717/127; 726/22; 726/24
(58) Field of Classification Search ................. 717/127; 726/24
See application file for complete search history.

(56) References Cited

U.S. PATENT DOCUMENTS

| | | | | |
|---|---|---|---|---|
| 5,600,790 A * | 2/1997 | Barnstijn et al. | ............... | 714/38 |
| 5,832,208 A * | 11/1998 | Chen et al. | ..................... | 726/24 |
| 5,918,039 A | 6/1999 | Buswell et al. | | |
| 6,266,774 B1 * | 7/2001 | Sampath et al. | ............... | 726/24 |
| 6,334,214 B1 * | 12/2001 | Horstmann | ................. | 717/170 |
| 6,654,888 B1 * | 11/2003 | Cooper et al. | ............... | 713/190 |
| 6,788,769 B1 * | 9/2004 | Waites | ..................... | 379/93.24 |
| 6,854,061 B2 * | 2/2005 | Cooper et al. | ............... | 713/190 |
| 6,918,038 B1 * | 7/2005 | Smith et al. | .................... | 726/22 |
| 6,978,232 B1 * | 12/2005 | Tobler | ......................... | 703/21 |
| 7,113,948 B2 * | 9/2006 | Jhingan et al. | ................ | 707/10 |
| 7,152,164 B1 * | 12/2006 | Loukas | ....................... | 713/188 |
| 7,281,269 B1 * | 10/2007 | Sievers et al. | ................. | 726/24 |
| 2001/0053982 A1 * | 12/2001 | Niwa | ............................. | 705/1 |
| 2002/0147780 A1 * | 10/2002 | Liu et al. | ..................... | 709/206 |
| 2004/0015965 A1 * | 1/2004 | Sparks | ....................... | 717/178 |

FOREIGN PATENT DOCUMENTS

| | | | |
|---|---|---|---|
| JP | H10-21173 A | | 1/1998 |
| JP | 02002342084 A | * | 11/2002 |
| WO | WO 00/04674 | * | 1/2000 |

OTHER PUBLICATIONS

"Demonstration Environment Provision System of Software and Demnstration Environment Provison Method of Software" Suzuki.*

* cited by examiner

*Primary Examiner*—Wei Y Zhen
*Assistant Examiner*—Phillip H Nguyen
(74) *Attorney, Agent, or Firm*—John F. A. Earley, III; Frank J. Bonini, Jr.; Harding, Earley, Follmer & Frailey, P.C.

(57) ABSTRACT

Apparatus, methods and articles of manufacture for software demonstration are disclosed. Apparatus include a server that provides, via a network, a program or programs to be demonstrated to a user. The user uploads the code that the program will execute. Results are then supplied after execution, and may be made available to the user in a number of ways. Methods and articles of manufacture are also disclosed.

20 Claims, 1 Drawing Sheet

APPARATUS, METHODS AND ARTICLES OF MANUFACTURE FOR SOFTWARE DEMONSTRATION

FIELD OF THE INVENTION

The present invention relates to software demonstration. More specifically, the present invention relates to software demonstration through computer networks.

BACKGROUND OF THE INVENTION

Providing software for user demonstration may be difficult. For example, a stand alone software product may be demonstrated through physically delivering a trial copy to a user, or permitting download of a trial copy and subsequent installation on a user's machine, and there are few technical difficulties associated with such procedures. However, if the software is not standalone, and/or requires installation and integration with existing software, a demonstration cannot easily be installed and less easily removed from a user's system.

One example of software that needs integration into a user's system or network is email system software. Email system software usually requires installation on a server and configuration to accommodate the network and its users. Although demonstration copies can be provided on demonstration machines, the peculiarities of a user's system and/or network may make any such demonstration of such a software product less than convincing.

If the software is being offered as a service, such as might be done by an Application Service Provider ("ASP") with an email scanning service, demonstration difficulties are multiplied. When email scanning software is offered as a service, a live demonstration requires resources—a sales person for example, with a properly configured machine. Similar to the difficulties noted above with regard to demonstrating a product, demonstrating a service on a machine or network other than a user's machine or network may simply be unconvincing.

Internet based demonstrations do eliminate at least one difficulty associated with software demonstration of either a service or product by making distribution of a trial product or service less costly than physical demonstration. However, Internet demonstrations of a software service that requires integration with a user's system or network, such as an email system, may be impossible because the Internet or file server offering the demonstration software service is not the user's. Thus, integration issues cannot be revealed in such a demonstration.

Certain methods have been developed to attempt to solve software service distribution difficulties. For example, a virus scanning service for email may let the user send his or her email to a server for virus scanning. This method often provides an open relay. In other words, email is sent to a server and the server scans the email and then forwards the email according to its address. The problem with this method is that open relay mail servers are insecure, for example, an email server may be used to distribute unsolicited bulk email (UBE); as a platform of attack for an email denial of service, etc. Difficulties may multiply—once a mail server is being used to distribute UBE or in another unauthorized fashion, the server may be blacklisted or isolated from other email servers through placement on a DNS blocked list, etc. Thus an open relay method may be unacceptable.

Another method is to allow potential customers to send email to the server which is then processed and returned to the sender. However, this method may also be unacceptable because a user may intercept email that is to be returned to the sender. For example, a malicious user could surreptitiously install a program on the demonstration server that allows the interception of email.

Accordingly, there exists a need for improved apparatus, methods and articles of manufacture for demonstrating software.

SUMMARY OF THE INVENTION

The present invention comprises apparatus, methods and articles of manufacture for software demonstration. Methods comprise providing an identified user with access, via a network, to a server comprising a program to be demonstrated; receiving code from the user that will be executed by the program; executing the code within the program to be demonstrated; and, providing any results of the execution. Thus the user and others can review the performance of the software to be demonstrated on data supplied by the user, without implicating the user's system. Moreover, embodiments are made available over the Internet. Apparatus and articles of manufacture are also disclosed.

DETAILED DESCRIPTION OF THE PREFERRED EMBODIMENTS

Figure 1:
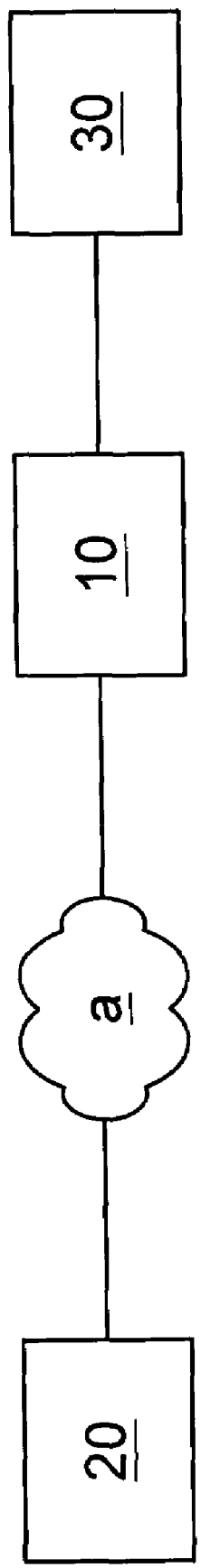
FIG. 1 shows the use of a preferred embodiment.

The present invention comprises apparatus, methods and articles of manufacture for software demonstration. Embodiments may provide demonstrations of programs upon user-supplied code ("code" as used herein generally includes text, data, and files, as well as binaries) in any number of ways desired, for example, a single product (e.g., an email scanner from a single vendor,) a comparison of products in the same market (e.g., email scanners from different vendors) products in different markets (e.g., email scanners and proscribed code scanners,) combinations of these, etc.

FIG. 1 shows a email antivirus scanner program 30 accessible to user 20 via server 10 over network a. In this and other preferred embodiments, network a is the Internet, and server 10 is generally available via the Internet.

User 20 obtains access to program 30 in various ways in various embodiments. Generally, the preferred embodiments provide limited secured access through user identification as is further described below. However, it should be noted that access may be provided, in other embodiments, according to any methods. For example, access may be provided without restriction to any user, predefined restrictions may be applied to users as desired, etc.

Limited secured access is controlled a number of ways in various preferred embodiments. Generally, in the preferred antivirus email embodiments, a unique, operational email address, generated manually and/or automatically, is used to both identify the user and provide a destination for the user's email to be tested for the demonstration, as will be explained further below. For example, in a preferred embodiment a user may fill out a registration form, and then be contacted by the demonstrator's operator, in order to be provided with an demonstration email address and password. As another example, a user may automatically be provided with a demonstration email address upon filling out a registration form. (In yet other embodiments, further identification may be required, e.g. credit cards, personal information, etc.) In especially preferred embodiments, the server will automatically create a user id. One method of doing so used in an especially preferred embodiment is to assign the user an id based upon the email address the user has used to submit the sample. That email address then becomes the user id.

Additionally, embodiments may attempt to simplify user email addressing, by, for example, allowing a user to provide her own email prefix, to be appended to a demonstrator provided email domain. Of course, in email and other embodiments, other identification methods can be used, such as an ID number, password, etc. Moreover, it should be noted, an identified user may be able to use an embodiment once or more than once, in a variety of ways, such as for a predetermined time, with a predetermined amount of data, etc.

Returning to FIG. 1, once user 20 obtains access to program 30, she uses the provided email address to send, forward or otherwise transmit the email to be scanned by the demonstrator. In the preferred embodiments, the email to be scanned is limited, e.g., by numbers, by size, by allowed attachments, etc.

Program 30 then demonstrates its attributes on the emails provided by the user e.g., by scanning for proscribed code. Program 30 returns the results to server 10, where it is displayed as a web page, accessible via any commonly available web browser.

The user then logs onto server 10 to retrieve the demonstration results. Results are presented as a web page, which may have been constructed in any number of ways as known in the art, e.g. Active Server Pages, PHP, Perl, HTML, XML, .jsp, etc. The results will, of course, vary with the program to be demonstrated. For example, an antivirus program will show the results of its scan on the user-provided emails, an antispam scanner will show its results, etc. Generally, the results of any particular program will be displayed in a web page using the reporting capabilities of that particular program. It may also be desired, however, to provide results in other formats, for example, standardized formats across programs to be demonstrated, via email to a user address, etc. and so results may be presented in a predetermined format as well.

Thus the user is able to view the efficacy of the demonstrated program. If desired, in certain embodiments, a link may then be provided to purchase the demonstrated program, if the user desires.

Data obtained from the demonstrations may be retained on an as-desired basis; for example, daily, weekly, as run, when server space becomes limited, etc. Data obtained from the demonstrations may also be used to refine demonstration programs, if desired.

Of course, various embodiments may use various operating systems and technologies. For example, servers may be used that run on Sun Solaris® Unix®, as well as other Unix® and Unix®-like platforms, including but not limited to Linux® and its variants, OS X, as well as other operating system platforms and code including but not limited to Microsoft Server 2003, Microsoft Windows® XP, Windows® NT, Windows® 2000, Windows® 95, 98 CE and Me, IBM OS/390, MacOS, VxWorks,® Palm OS, Symbian, Java and others. The demonstration system may be present in a different operating system than the user's machine, as all that may be necessary for the user is a web browser, in those web-based embodiments. Moreover, embodiments may be constructed in a number of ways, e.g., present on a single server, where the program to be demonstrated resides on that server, across a number of servers, machines, in a distributed fashion, etc.

Embodiments may be highly secured systems as well and use various security methods, both described herein and as known in the art, to secure access. Increased security may also be provided in various embodiments through other methods. For example, passwords may be used in various manners in order to attempt to increase security of the embodiment. For example, either or both providing data and receiving results may be subject to password protection, and that password protection may be used in a number of ways. For example, passwords may be required by the system in the headers or body of a forwarded message; to display of test results, etc.

Embodiments may also provide secure shut down mechanisms. So, for example, if an embodiment detects that it is under a denial of service attack via mail flood or any other method, from another node, system or systems on the network, it can configure itself and/or a network gateway to temporarily not accept connections from the node, system or systems that are doing the attack. The embodiment would then report the attack to a network administrator.

Embodiments may also remove user emails on a predetermined schedule. For example, any email addresses that are not assigned to an active user (one using the system for demonstration purposes) may be removed as soon as possible, on a regular schedule, etc. As another example, the server may be moved from domain to domain in order to minimize tampering. Email addresses may then be removed, be made unusable, etc.

Demonstrations may be of any programs desired and, in various embodiments, one or more programs may be made available for demonstration. In certain preferred embodiments, those products made available for demonstration may be from a single vendor. Yet other preferred embodiments may make products available from multiple vendors for demonstration, e.g., comparative testing offered by network and/or web-based retailers, reviewers, etc. Thus, the same user provided data may be used to test a number of programs, e.g. a user might desire to test competing antivirus programs, competing compilers, etc. and results from each program be provided accordingly. It should be noted that any number of programs may be demonstrated as desired, as well as upgrades, patches, maintenance fixes, etc.

As embodiments may be provided to demonstrate various types of software, embodiments may provide, to a server or servers containing the program or programs to be demonstrated, any type of user provided code. For example, a user may provide code specific to the demonstration and so may provide other types of code instead of, or in addition to, email. For example, user provided code may be transmitted in order to have a server demonstration of instant messaging code, peer-to-peer code, validity checker(s), syntax checker(s), etc.

Embodiments are available as desired. For example, because of their automated nature, an embodiment may be made available constantly over the Internet, and thus accessible to users.

The above description and the views and material depicted by the figures are for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

The invention claimed is:

1. An apparatus for software demonstration comprising:
   a server including a storage component and being configured with an antivirus scanner program to be demonstrated installed thereon in said storage component;
   said server being accessible to an identified user identified by a unique email address that comprises a destination for email received by the user at a different address that is to be tested for the demonstration, said server being configured to receive code comprising email from said identified user machine, execute said received code comprising email with said antivirus scanner program to be demonstrated, and provide results of said execution based on the application of said antivirus scanner program to be demonstrated to said code comprising email, wherein said server and said antivirus scanner program to be demonstrated installed thereon are configured to manipulate said received code to provide a result, based on said received code that corresponds with the antivirus scanner program to be demonstrated to provide the results that would have been obtained if the antivirus scanner program were installed on the user machine from which the received code was obtained, wherein said apparatus further includes a network in which said code is received by said server from said identified user; wherein said apparatus is configured to provide results of said demonstrated attributes of said program for displaying as a web page; and wherein said apparatus is further configured to accent a log on from said identified user associated with said unique email address for retrieval of said demonstration results.

2. An apparatus as in claim 1 wherein said server is accessible to said identified user via the Internet.

3. An apparatus as in claim 1 wherein said server is configured to provide results of said execution via a web page.

4. An apparatus as in claim 1 wherein said apparatus is in distributed form.

5. An article of manufacture comprising at least one server having a communications link and having a storage component and being configured with an antivirus scanner program to be demonstrated installed thereon and being configured with a web site providing access to the antivirus scanner program to be demonstrated by identifying a user by a unique email address wherein said email address comprises a destination for email received by the user at a different address to be tested for the demonstration, whereby said antivirus scanner program to be demonstrated executes with said server code comprising email that is provided by an identified user identified by a unique email address that comprises a destination for email received by the user at a different address to be tested for the demonstration; and said web site further provides results of said execution; wherein said article is configured to provide results of said demonstrated attributes of said program for displaying as a web page; and wherein said apparatus is further configured to accept a log on from said identified user associated with said unique email address for retrieval of said demonstration results.

6. An article as in claim 5 wherein said website further provides results of said execution via a web page.

7. A method of performing software demonstration for demonstration of an antivirus scanner program on user supplied email comprising:
providing a server having a communications link and being configured with an antivirus scanner program;
providing an identified user with access, via a network, to the server comprising the antivirus scanner program to be demonstrated;
identifying the user by a unique email address;
wherein said email address comprises a destination for email received by the user at a different address to be tested for the demonstration;
communicating using said email address email for scanning by said antivirus scanner program to be demonstrated;
demonstrating attributes of said antivirus scanning program on said communicated email by scanning said email for proscribed code;
providing results of said demonstrated attributes of said program on said emails to a server and displaying said results as a web page;
accepting a log on to said server from said identified user associated with said unique email address for retrieval of said demonstration results.

8. A method as in claim 7 wherein said server is a highly secured server.

9. A method as in claim 7 wherein said providing an identified user with access, via a network, to the server comprising an antivirus program to be demonstrated further comprises providing said identified user with access, via the Internet.

10. A method as in claim 7, further comprising limiting the amount of email that may be communicated by said user for demonstration by said antivirus scanning program.

11. A method as in claim 7, wherein demonstrating attributes of said program further comprises demonstrating for a predetermined time.

12. A method as in claim 7, further comprising providing said identified user with an option to purchase said program.

13. A method as in claim 7, further comprising providing said server with a secure shut down mechanism, wherein said server shutdown mechanism is configured with an instruction to temporarily refuse acceptance of connections from a node, system or systems that are doing the attack.

14. A method as in claim 7, comprising at least two programs to be demonstrated wherein at least one program to be demonstrated comprises an antivirus scanner program; and wherein each of said programs to be demonstrated is executed on the same communicated email.

15. A method as in claim 7, wherein said web page accessible to one or more of said user and others.

16. The method of claim 7,
wherein said results provided comprise the results that would have been obtained if the antivirus scanner program were installed for operation on the user machine from which the received code comprising email was obtained.

17. The method of claim 16, wherein communicating email for scanning by said antivirus scanner program to be demonstrated is automatically configured to communicate said email for scanning by the antivirus program to be demonstrated, and wherein said server is automatically configured to demonstrate attributes of said antivirus scanning program on said communicated email by scanning said email for proscribed code and to provide the results of said demonstrated attributes of said program on said emails and to display said results as a web page.

18. The method of claim 7, wherein the demonstration comprises a plurality of programs that may be comparatively demonstrated.

19. The method of claim 18, wherein a plurality of demonstration programs are provided, and wherein a retailer of one or more of said plurality of demonstration programs provides comparative testing of a user's email for said plurality of demonstration programs.

20. The method of claim 7, wherein providing an identified user with access includes generating a unique operational email address for the user.

* * * * *